(12) United States Patent
Shimizu

(10) Patent No.: US 11,509,007 B2
(45) Date of Patent: Nov. 22, 2022

(54) REFRIGERATION CYCLE DEVICE FOR COOLING BATTERY

(71) Applicant: DENSO CORPORATION, Kariya (JP)

(72) Inventor: Kouji Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 16/923,676

(22) Filed: Jul. 8, 2020

(65) Prior Publication Data
US 2020/0343611 A1   Oct. 29, 2020

Related U.S. Application Data

(63) Continuation of application No. PCT/JP2018/043444, filed on Nov. 26, 2018.

(30) Foreign Application Priority Data

Jan. 25, 2018 (JP) .............................. JP2018-010581

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04); *H01M 10/63* (2015.04); *H01M 2220/20* (2013.01)

(58) Field of Classification Search
CPC .......... H01M 10/6568; H01M 10/613; H01M 10/625; H01M 10/63; H01M 2220/20;
(Continued)

(56) References Cited

U.S. PATENT DOCUMENTS 5,347,821 A * 9/1994 Oltman ............... F04C 29/0007
62/84
5,435,144 A * 7/1995 Kalmbach ............. F04C 23/001
62/84
(Continued)

FOREIGN PATENT DOCUMENTS

JP    H09-290622 A    11/1997
JP    2000111180 A     4/2000
(Continued)

*Primary Examiner* — Len Tran
*Assistant Examiner* — Gustavo A Hincapie Serna
(74) *Attorney, Agent, or Firm* — Harness, Dickey & Pierce, P.L.C.

(57) ABSTRACT

A refrigeration cycle cools a battery. A controller controls a refrigerant flow rate flowing through a battery cooling system so as to adjust a temperature of the battery. The controller adjusts the refrigerant flow rate flowing in the battery cooling system so that the oil retained in the battery cooling system is flushed toward the compressor. The battery cooling system has a plurality of parallel systems. Electric expansion valves as flow adjusting valves are controlled so as to intermittently provide an oil-back operation. In the oil-back operation, the flow rate of the refrigerant flowing through a part among the plurality of parallel systems is increased more than a flow rate of the refrigerant flowed by a temperature control unit.

9 Claims, 7 Drawing Sheets

(51) Int. Cl.
  *H01M 10/625* (2014.01)
  *H01M 10/63* (2014.01)

(58) Field of Classification Search
  CPC ............ H01M 50/20; H01M 10/0525; H01M 10/647; H01M 10/6554; B60H 1/00271; B60H 1/00278; B60H 2001/00307; B60H 1/32; B60H 1/3228; B60K 1/04; F25B 1/00; F25B 5/02
  USPC .................................................... 62/259.2
  See application file for complete search history.

(56) References Cited

U.S. PATENT DOCUMENTS

| | | | | |
|---|---|---|---|---|
| 5,878,589 | A * | 3/1999 | Tanaka | F25B 1/10 165/80.2 |
| 5,884,494 | A * | 3/1999 | Okoren | F04C 28/28 62/193 |
| 6,145,325 | A * | 11/2000 | Hanselmann | F25B 49/022 62/84 |
| 6,314,750 | B1 * | 11/2001 | Ishikawa | B60H 1/3214 62/324.1 |
| 6,351,959 | B1 * | 3/2002 | Hirota | F25B 43/006 62/198 |
| 7,104,076 | B2 * | 9/2006 | Scarcella | F25B 41/22 62/84 |
| 7,347,061 | B2 * | 3/2008 | Lee | G01F 23/76 62/468 |
| 8,387,406 | B2 * | 3/2013 | Ziehr | F25B 31/004 62/278 |
| 8,899,492 | B2 * | 12/2014 | Kelty | B60L 58/16 320/150 |
| 9,897,356 | B2 * | 2/2018 | Graaf | B60H 1/323 |
| 10,001,317 | B2 * | 6/2018 | Takenaka | F25D 21/006 |
| 10,625,566 | B2 * | 4/2020 | Androulakis | B60H 1/00295 |
| 2003/0051494 | A1 * | 3/2003 | Ohya | B60H 1/3214 62/199 |
| 2006/0016203 | A1 * | 1/2006 | Hayashi | F25B 31/004 62/157 |
| 2014/0041826 | A1 * | 2/2014 | Takeuchi | B60L 1/08 165/10 |
| 2014/0326010 | A1 | 11/2014 | Kawakami et al. | |
| 2015/0033782 | A1 * | 2/2015 | Kondo | B60H 1/00921 62/244 |
| 2019/0030989 | A1 * | 1/2019 | Miura | F25B 5/04 |
| 2020/0189417 | A1 * | 6/2020 | Amarasinghe | B60L 58/26 |

FOREIGN PATENT DOCUMENTS

| | | |
|---|---|---|
| JP | 2003166764 A | 6/2003 |
| JP | 2004211944 A | 7/2004 |
| JP | 2005090862 A | 4/2005 |
| JP | 2007069733 A | 3/2007 |
| JP | 2011075275 A | 4/2011 |
| JP | 2012037203 A | 2/2012 |
| JP | 2012122638 A | 6/2012 |
| JP | 5344606 B2 | 11/2013 |
| WO | WO-2013093991 A1 | 6/2013 |

* cited by examiner

REFRIGERATION CYCLE DEVICE FOR COOLING BATTERY

CROSS-REFERENCE TO RELATED APPLICATIONS

The present application is a continuation application of International Patent Application No. PCT/JP2018/043444 filed on Nov. 26, 2018, which designated the U.S. and claims the benefit of priority from Japanese Patent Application No. 2018-10581 filed in Japan filed on Jan. 25, 2018, the entire disclosure of the above application is incorporated herein by reference.

TECHNICAL FIELD

The disclosure in this specification relates to a refrigeration cycle device for cooling a battery.

BACKGROUND

A battery requires temperature control to keep an appropriate temperature range during a charge and/or a discharge. In some application, a vapor compression refrigeration cycle is used for adjusting the temperature of the battery.

SUMMARY

In a described aspects in this specification, or in other aspects not mentioned, there is a need for further improvements in the refrigeration cycle device for cooling a battery.

The battery cooling refrigeration cycle device disclosed herein comprises: a refrigeration cycle including a plurality of parallel systems for cooling the battery; a temperature control unit which controls the flow rate of the refrigerant flowing through the plurality of parallel systems so as to adjust a temperature of the battery; and an oil-back control unit flushes away an oil retained in a part among the plurality of parallel systems by increasing a refrigerant flow rate flowing in a part among the plurality of parallel systems more than a refrigerant flow rate flowed by the temperature control unit, and at the same time, maintaining or decreasing a refrigerant flow rate flowing through the remaining part among the plurality of parallel systems.

According to the disclosed refrigeration cycle device for cooling a battery, a temperature of the battery can be adjusted by a temperature control unit. Moreover, even if an oil is retained in a part among a plurality of parallel systems, the retained oil can be flushed away. In particular, an oil-back control unit increases a flow rate of a refrigerant flowing through a part among the plurality of parallel systems more than a flow rate of the refrigerant flowed by the temperature control unit. At the same time, the oil-back control unit maintains or decreases the flow rate of the refrigerant flowing through the remaining part among the plurality of parallel systems. For this reason, the oil in a part of the parallel system can be flushed away without increasing an overall flow rate of the refrigerant circulating in the refrigeration cycle. Therefore, it is possible to suppress the trouble caused by the retained oil without increasing a power consumption of the refrigeration cycle.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes.

The objects, features, and advantages disclosed in this specification will become apparent by referring to following detailed descriptions and accompanying drawings.

DETAILED DESCRIPTION

Figure 1:
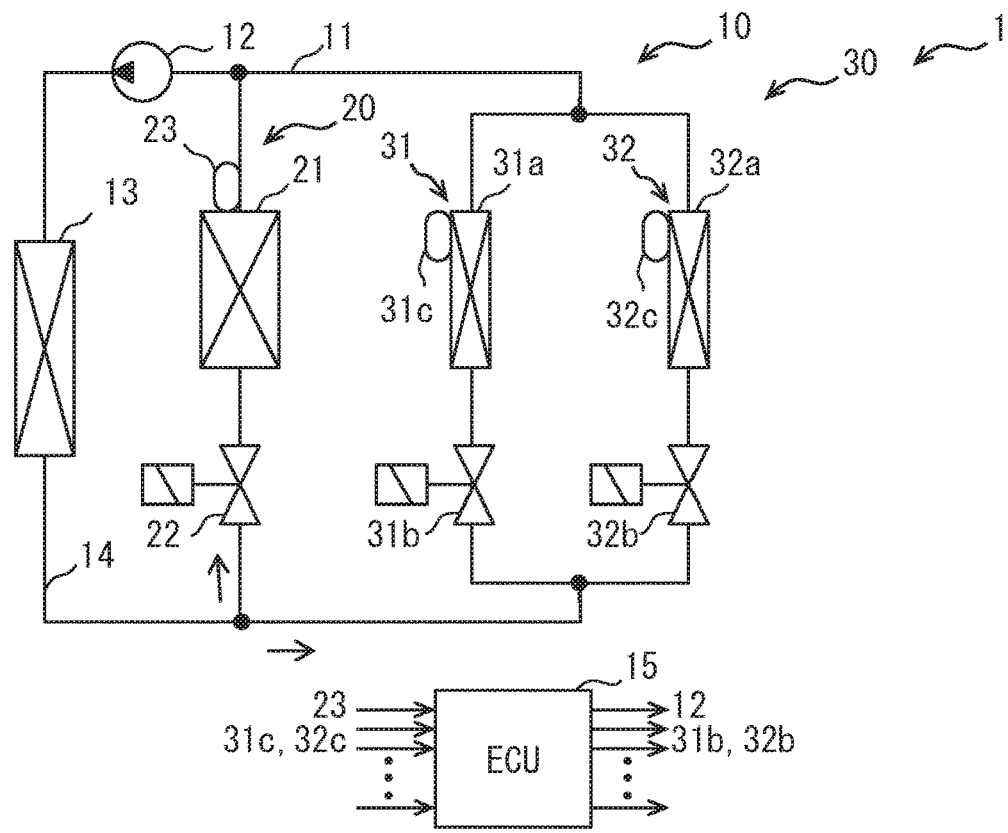
FIG. 1 is a block diagram showing a refrigeration cycle of a first embodiment.

Hereinafter, a plurality of embodiments are described with reference to the drawings. In some embodiments, parts which are functionally and/or structurally corresponding and/or associated are given the same reference numerals, or reference numerals with different hundreds digit or higher digits. For corresponding parts and/or associated parts, additional explanations can be made to the description of other embodiments.

First Embodiment

In FIG. 1, a refrigeration cycle device 1 for cooling a battery provides a refrigeration cycle device for vehicles. The term vehicle should be interpreted in a broad sense, and includes a moving body such as a vehicle, an aircraft, a ship, and a moving body such as an amusement equipment. The battery cooling refrigeration cycle device 1 adjusts a temperature of the battery by cooling the battery used in the vehicle. In the following description, controlling a temperature of the battery is typically described in terms of cooling. The battery in this embodiment is a relatively large battery that supplies electric power to a vehicle traveling motor.

The battery cooling refrigeration cycle device 1 includes a vapor compression refrigeration cycle 10. At the same time, the refrigeration cycle 10 provides a refrigeration cycle device for air conditioning. The refrigeration cycle 10 has a refrigerant 11. The refrigeration cycle 10 constitutes a cycle in which the refrigerant 11 circulates. The refrigeration cycle 10 includes a compressor 12. The compressor 12 sucks the refrigerant and compresses the refrigerant. The compressor 12 is driven by electricity. The refrigeration cycle 10 includes a radiator 13 that radiates heat from the refrigerant compressed by the compressor 12. The radiator 13 is also called a condenser. The compressor 12 and the radiator 13 mainly provide a high pressure system in the refrigeration cycle 10. The refrigeration cycle 10 has an oil 14 that lubricates the compressor 12 and flows together with the refrigerant 11. Further, the refrigeration cycle 10 has a controller 15 (ECU).

The refrigeration cycle 10 has a low pressure system that evaporates the refrigerant. The refrigeration cycle 10 includes an air conditioning system 20 and a battery cooling system 30. The air conditioning system 20 and the battery cooling system 30 mainly provide the low pressure system.

The air conditioning system 20 includes a cooler 21 and an electric expansion valve 22 as a pressure reducer. The cooler 21 is a heat exchanger that cools air. The cooler 21 is also called an evaporator. The air conditioning system 20 has a sensor 23 to detect the degree of superheat of the refrigerant near the outlet of the cooler 21. The sensor 23 can be provided by a temperature sensor. The sensor 23 may be provided by various sensors such as a pressure sensor and a superheat sensor. The sensor 23 outputs a signal indicating a cooling degree of the cooler 21. The signal of the sensor 23 is used to control the electric expansion valve 22. The controller 15 controls the electric expansion valve 22 based on the signal from the sensor 23.

The battery cooling system 30 has a plurality of parallel systems 31 and 32. Each of the plurality of parallel systems 31 and 32 provides a low pressure system. In this embodiment, the battery cooling system 30 has two parallel systems 31 and 32. The first parallel system 31 and the second parallel system 32 are similar.

The parallel systems 31 and 32 have coolers 31a and 32a and electric expansion valves 31b and 32b as pressure reducers. The electric expansion valves 31b and 32b provide flow rate adjusting valves that control the flow rate of the refrigerant in the coolers 31a and 32a. The coolers 31a and 32a are heat exchangers that cool the battery. The coolers 31a and 32a are also called evaporators. The parallel systems 31 and 32 have sensors 31c and 32c in order to detect the degrees of superheat of the refrigerant near the outlets of the coolers 31a and 32a. The sensors 31c and 32c may be provided by a temperature sensor. The sensors 31c and 32c may be provided by various sensors such as a pressure sensor and a superheat sensor. The sensors 31c and 32c output signals indicating the cooling degree of the coolers 31a and 32a. The signals of the sensors 31c and 32c are used to control the electric expansion valves 31b and 32b. The controller 15 controls the electric expansion valves 31b and 32b based on the signals of the sensors 31c and 32c.

The electric expansion valves 22, 31b, and 32b provide a flow rate adjusting unit that controls the flow rate of the refrigerant. The flow rate adjusting unit can adjust the refrigerant flow rate according to the cooling load, and can flow the refrigerant flow rate that pushes the staying oil. The flow rate adjusting unit may switch between a state in which the refrigerant flow rate is adjusted according to the cooling load and a state in which the refrigerant flow rate to flush the retained oil is supplied. The state in which the refrigerant flow rate is adjusted according to the cooling load is also called the feedback control state. The state in which the refrigerant flow rate to flush the retained oil is supplied is called a large opening state or an oil-back control state.

The electric expansion valves 22, 31b, and 32b include actuators such as electromagnetic motors. The electric expansion valves 22, 31b, and 32b continuously adjust an orifice opening as a pressure reducer. The electric expansion valves 22, 31b, and 32b are also called electronic expansion valves. The electric expansion valves 22, 31b, and 32b may be provided by various devices such as a parallel circuit of a pressure reducer and a solenoid valve, or a parallel circuit of a temperature-sensitive expansion valve and a solenoid valve.

The controller 15 is an electronic control unit (Electronic Control Unit). The controller 15 has at least one arithmetic processing unit (CPU) and at least one memory device (MMR) as a storage medium for storing programs and data. The controller 15 may be provided by a microcomputer that includes a computer-readable storage medium. The storage medium is a non-transitional tangible storage medium that stores a computer-readable program in a non-transitory fashion. The storage medium may be provided by a semiconductor memory, a magnetic disk, or the like. The controller 15 may be provided by a computer or a set of computer resources linked by data communication device. The program is executed by the controller 15 to cause the controller 15 to function as the device described in this specification and to function the controller 15 to execute the method described in this specification.

The control system including the controller 15 provides various elements. At least part of such elements may be referred to as a block for performing a function. In another aspect, at least a part of those elements may be referred to as sections or sections that are interpreted as a configuration. Furthermore, only in a case intended, such elements included in the control system may be referred to as means for performing the functions thereof.

Means and/or functions provided by the control system can be provided by software recorded in a substantive memory device and a computer that can execute the software, software only, hardware only, or some combination of them. For example, when an electronic circuit, which is hardware, serves as the controller, the electronic circuit can be a digital circuit that includes many logical circuits, or an analog circuit.

Figure 2:
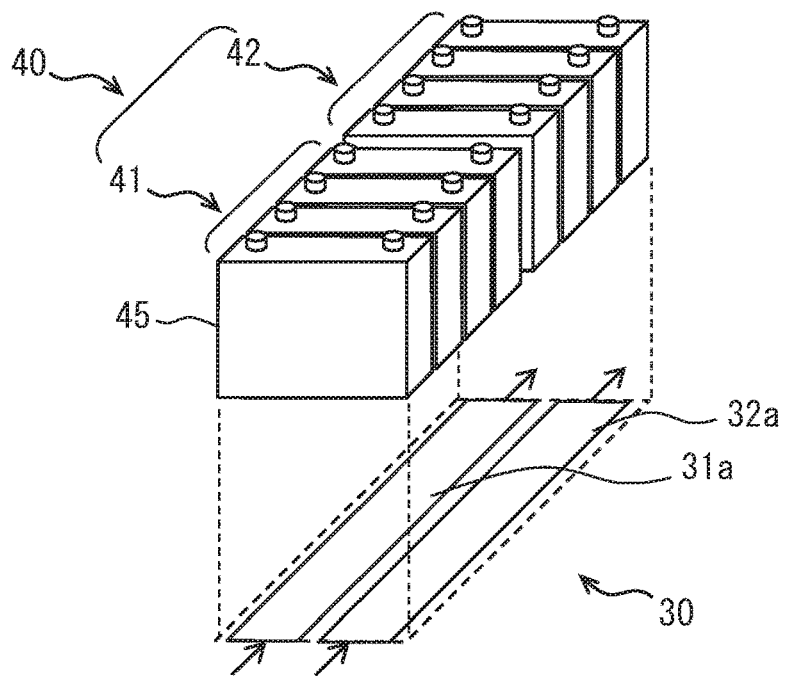
FIG. 2 is a perspective view showing a battery.

In FIG. 2, the battery 40 cooled by the battery cooling system 30 has a plurality of cell batteries 45. One cell battery 45 is one container that shares an electrolyte. One cell battery 45 is also a minimum battery unit having at least a positive electrode and a negative electrode. The plurality of cell batteries 45 are connected in series and/or in parallel. The battery 40 has a plurality of group batteries 41 and 42. Each of the group batteries 41 and 42 includes a plurality of cell batteries 45. In the illustrated example, the battery 40 includes two group batteries 41 and 42. One group battery 41 includes four cell batteries 45.

The plurality of coolers 31a and 32a remove heat from the battery 40 by coming into contact with the battery 40 in a direct manner. The plurality of coolers 31a and 32a are arranged so as to supply a plurality of cooling capacities from them to one cell battery 45. The plurality of coolers 31a and 32a are arranged so as to supply a plurality of cooling capacities from them to one group battery 41. The plurality of coolers 31a and 32a are arranged so as to supply a plurality of cooling capacities from them to one group battery 42. The plurality of coolers 31a and 32a are arranged so as to supply a plurality of cooling capacities from them to one battery 40. The cooling object may also be other than the one shown.

In other words, the plurality of coolers 31a and 32a belonging to the plurality of parallel systems 31 and 32 cool one cell battery 45 or one group battery 41 and/or group battery 42. As a result, even if a part of the cooling capacity of a cooler among the plurality of coolers 31a and 32a is reduced or the cooling capacity is lost, the remaining part of coolers can cool the battery. Therefore, a possibility that all of the cooling capacity for the entire battery 40, the entire group battery 41, the entire group battery 42, and the entire single cell battery 45 is lost is suppressed.

Figure 3:
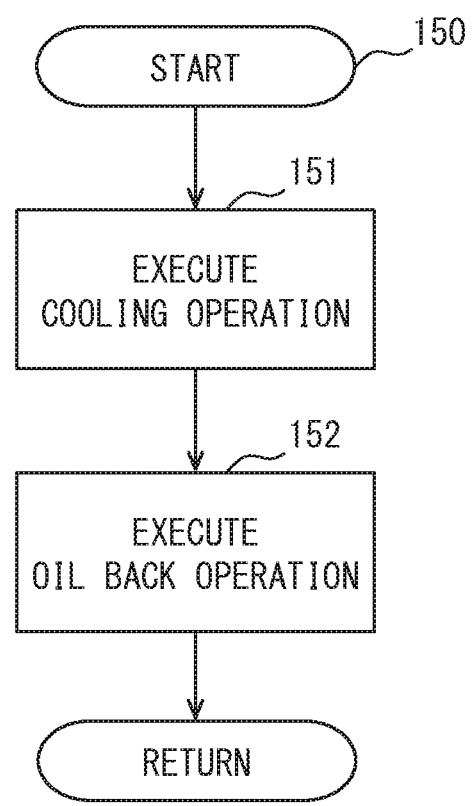
FIG. 3 is a flowchart showing control of a refrigeration cycle.

In FIG. 3, an oil-back control process 150 by the controller 15 is shown. In a step 151, the controller 15 executes a cooling operation so that the coolers 21, 31a, and 32a perform required cooling capacities. In the cooling operation, the compressor 12 is operated and the electric expansion valves 22, 31b, 32b are controlled. The controller 15 controls the electric expansion valve 22 so as to obtain an efficient degree of superheat according to the cooling load of the cooler 21. The controller 15 controls the electric expansion valves 31b and 32b so as to obtain an efficient degree of superheat according to the cooling loads of the coolers 31a and 32a. Thereby, the air conditioning system 20 provides a dehumidification or a cooling. In the battery cooling system 30, the battery 40 is cooled. The controller 15 feedback-controls the electric expansion valves 31b and 32b according to the output signals of the sensors 31c and 32c.

When the refrigeration cycle 10 is controlled according to the cooling load, some oil may be retained in the coolers 21, 31a, and 32a. In particular, when the cooling load is small, the openings of the electric expansion valves 22, 31b, 32b are narrowed. Therefore, the refrigerant flow rate is reduced and the oil retains. Such a retained oil reduces an oil back to the compressor 12 and impairs lubrication and/or cooling of the compressor 12. Further, the retained oil may hinder heat exchange in the coolers 21, 31a, and 32a.

In a step 152, the controller 15 executes an oil-back control so that the refrigeration cycle 10 is operated to back the oil. The step 152 provides an oil-back control unit. The oil-back control makes the refrigerant flow rates of the plurality of parallel systems 31 and 32 different from each other, and makes the refrigerant flow rate of either one of the parallel systems into a large flow rate such that the retained oil is flushed away. This large flow rate is greater than the cooling flow rate required to cool the battery. The step 152 provides an oil-back control unit.

The oil-back control is provided by increasing only the refrigerant flow rate in some of the parallel systems 31 and 32 from the flow rate according to the cooling load. In the oil-back control, the flow rate of the refrigerant in the remaining part of the parallel circuit is maintained at the flow rate according to the cooling load. In the oil-back control, the flow rate of the refrigerant in the remaining part of the parallel circuit may be limited to be smaller than the flow rate according to the cooling load. The oil-back control in the step 152 sequentially changes a part the parallel systems among the plurality of parallel systems 31 and 32. When the battery cooling system 30 includes two parallel systems 31 and 32, the oil-back control unit alternately switches some of the parallel system on which the oil-back control is performed among the two parallel systems 31 and 32.

The oil-back control process 150 repeats the step 151 and the step 152. Thereby, the retained oil in the coolers 31a and 32a is suppressed.

Figure 4:
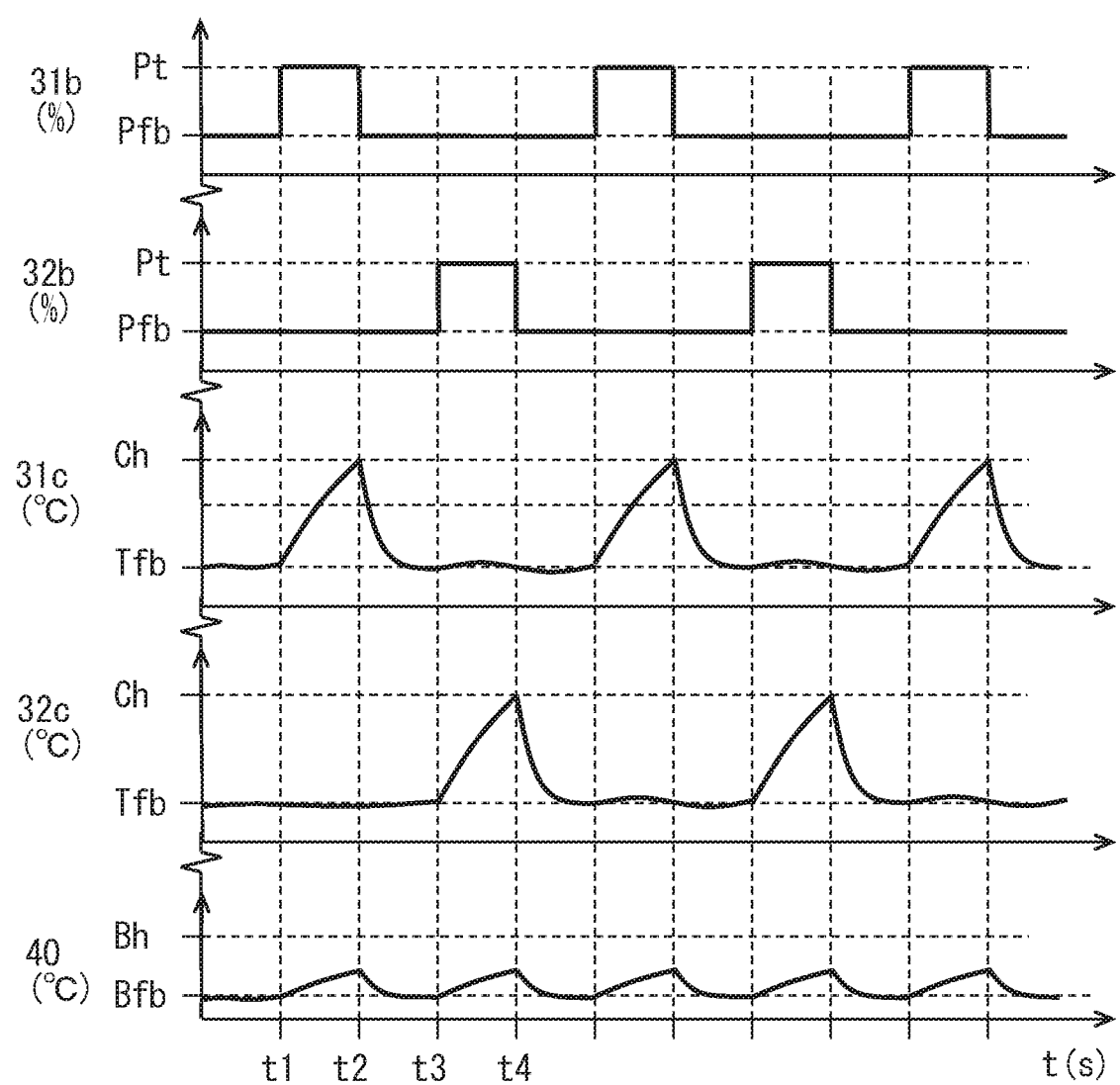
FIG. 4 is a waveform diagram showing an example of operation of the refrigeration cycle.

FIG. 4 shows a waveform diagram by the oil-back control. The horizontal axis indicates an elapse of time t (seconds). The vertical axis represents an opening degrees (%) of the electric expansion valves 31b and 32b, a detected temperatures (° C.) of the sensors 31c and 32c, and a temperature (° C.) of the battery 40.

The electric expansion valves 31b and 32b are controlled to an opening degree Pfb according to the cooling load. The electric expansion valves 31b and 32b are intermittently subjected to the oil-back control. Therefore, the control by the oil-back control unit is intermittent. In the oil-back control, the electric expansion valves 31b and 32b are controlled to an opening degree Pt which is capable of supplying the refrigerant flow rate that flushes the retained oil. The temperatures detected by the sensors 31c and 32c are feedback-controlled to the temperature Tfb at which the battery 40 can be maintained at the target temperature. At this time, the temperature of the battery 40 is also feedback-controlled to the temperature Bfb.

Between the time t1 and the time t2, the oil-back control is executed on the parallel system 31. The oil-back control of the parallel system 32 is executed between the time t3 and the time t4. The oil-back control in the plurality of parallel systems 31 and 32 is sequentially executed. The oil-back control in the plurality of parallel systems 31 and 32 is not executed at the same time. The oil-back control in the plurality of parallel systems 31 and 32 is alternately executed.

The execution timing, interval, and period of the oil-back control on the plurality of parallel systems 31 and 32 may be provided by a timer control or a scheduled control.

In the period between time t1 and time t2, the first parallel system 31 is subject to the oil-back control. During this period, the second parallel system 32 is controlled according to the cooling load. During this period, the opening degree of the electric expansion valve 31b is controlled to the opening degree Pt. The flow rate of the refrigerant supplied to the cooler 31a becomes a large flow rate. The large flow rate provided by the opening degree Pt is larger than the flow rate provided by the opening degree Pfb. That is, the temperature control unit controls the opening degree of the flow rate adjusting valve to the first opening degree Pfb, and the oil-back control unit controls the opening degree of the flow rate adjusting valve to the second opening degree (Pt) larger than the first opening degree. As a result, the temperature detected by the sensor 31c rises. Then, when the detected temperature reaches a limit temperature Ch for maintaining the battery 40 at the target temperature, the oil-back control ends. At this time, the temperature of the battery 40 is kept lower than a limit temperature Bh. During this period, the large flow rate of the refrigerant flowing through the first parallel system 31 pushes away the retained oil. As a result, the retained oil in the first parallel system 31 is suppressed, and the oil back to the compressor 12 is improved.

Between the time t2 and the time t3, the feedback control according to the cooling load is performed again. Thereby, the temperature of the battery 40 is feedback-controlled to the temperature Bfb again.

In the period between time t3 and time t4, the second parallel system 32 is subject to the oil-back control. During this period, the second parallel system 31 is controlled according to the cooling load. During this period, the opening degree of the electric expansion valve 32b is controlled to the opening degree Pt. The flow rate of the refrigerant supplied to the cooler 32a becomes a large flow rate. The large flow rate provided by the opening degree Pt is larger than the flow rate provided by the opening degree Pfb. As a result, the temperature detected by the sensor 32c rises. Then, when the detected temperature reaches the limit temperature Ch for maintaining the battery 40 at the target temperature, the oil-back control ends. At this time, the temperature of the battery 40 is kept lower than the limit temperature Bh. During this period, the large flow rate of the refrigerant flowing through the second parallel system 32 flushes away the retained oil. As a result, the retained oil in the second parallel system 32 is suppressed, and the oil back to the compressor 12 is improved.

The controller 15 provides the above-mentioned intermittent oil-back control that does not overlap with each other in the parallel systems 31 and 32. Thereby, the retained oil is flushed away even when the refrigerant flow rate in the compressor 12 is small.

According to the embodiment described above, the oil back to the compressor 12 can be secured in the refrigeration cycle including the coolers 31a and 32a for cooling the battery 40. Therefore, it is possible to suppress a deterioration of the quality of the refrigeration cycle including the compressor 12. Further, since the retained oil in the coolers 31a and 32a for cooling the battery 40 is suppressed, it is possible to suppress a deterioration of the cooling performance due to the retained oil. Further, since the oil can be backed to the compressor 12, power saving of the refrigeration cycle can be achieved.

By controlling the openings of the electric expansion valves 31b and 32b, the temperatures of the coolers 31a and 32a are feedback-controlled to the target temperature. By switching the target temperature from the first temperature Tfb for stably operating the battery 40 to the second temperature Ch that is higher than the first temperature Tfb, the openings of the electric expansion valves 31b and 32b are increased. Moreover, the second temperature Ch is set such that the temperature degrees and/or a duration are set so as not to impair the function of the battery. For example, the second temperature Ch and the duration of the second temperature Ch are set to be short in the recommended use temperature range of the battery 40. Therefore, the cooling efficiency can be improved while suppressing the performance deterioration of the battery 40.

Further, the electric expansion valves 31b and 32b of the plurality of coolers 31a and 32a are alternately subject to the oil-back control, and are controlled without overlap each other. Therefore, the flow rate of the refrigerant in the cooler subject to the oil-back control can be set to a large flow rate so as to flush the oil. Moreover, the flow rate of the refrigerant in the common compressor 12 is not excessively increased.

Further, when it is a low load period in which a refrigeration load of the refrigeration cycle due to the battery 40 is relatively low, the oil back is ensured even when the openings of the electric expansion valves 31b and 32b are relatively small. The low load occurs in the winter when the outside air temperature is low and the temperature of the battery 40 is relatively low, or in a low electric load when the charging load or the discharge load of the battery 40 is low and the temperature of the battery 40 is low. Since the oil-back control is executed at a time of a low load in which an oil is likely to be retained, problems caused by the retained oil are significantly suppressed.

The plurality of coolers 31a and 32a remove heat from the battery 40 by coming into contact with the battery 40 in a direct manner. The direct type coolers 31a and 32a generate higher pressure loss than the indirect type cooler that cools the battery 40 through a secondary medium such as water or air. As a result, the direct type cooler is likely to retain an oil. In this embodiment, since the oil-back control is applied to the direct type cooler, most of the oil used in the refrigeration cycle can be backed.

The battery cooling refrigeration cycle device includes the refrigeration cycle 10 including the plurality of parallel systems 31 and 32 that cool the battery 40. Further, the step 151 as a temperature control unit controls the flow rate of the refrigerant flowing through the plurality of parallel systems 31 and 32 so as to adjust the temperature of the battery 40. Further, the step 152 as the oil-back control unit increases the refrigerant flow rate flowing in a part among the plurality of parallel systems more than the refrigerant flow rate flowed in the step 151. At the same time, the step 152 maintains or decreases the refrigerant flow rate flowing to the remaining part among the plurality of parallel systems 31 and 32. Thereby, the oil retained in a part among the plurality of parallel systems 31 and 32 is flushed away.

According to the disclosed refrigeration cycle device for cooling a battery, a temperature of the battery 40 may be adjusted by a temperature control unit. Moreover, even if an oil is retained in a part among the plurality of parallel systems 31 and 32, the retained oil can be flushed away. For this reason, the oil in a part of the parallel system 31 (or 32) can be flushed away without increasing an overall flow rate of the refrigerant circulating in the refrigeration cycle 10. Therefore, it is possible to suppress troubles caused by the retained oil without increasing a power consumption of the refrigeration cycle.

Second Embodiment

This embodiment is a modification based on the preceding embodiment. In the above embodiment, the plurality of coolers cool one or a group of batteries. Alternatively, in this embodiment, one cooler cools one or a group of batteries.

Figure 5:
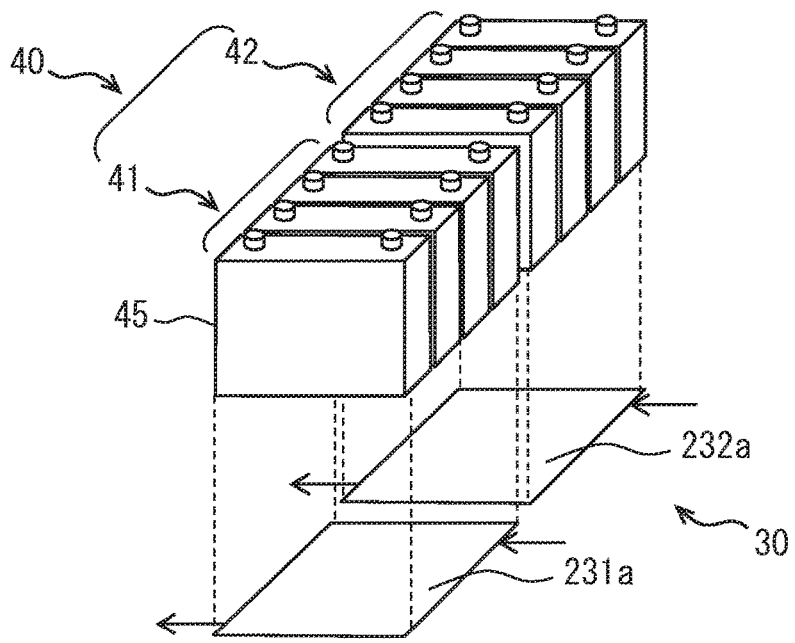
FIG. 5 is a perspective view showing a battery of a second embodiment.

In FIG. 5, a cooler 231a corresponds to the cooler 31a. A cooler 232a corresponds to the cooler 32a. Therefore, the parallel system 31 has the cooler 231a. The parallel system 32 has a cooler 231a.

The cooler 231a cools a group of batteries 41. The cooler 231a does not cool the other group of batteries 42. One cooler 231a cools one cell battery 45 or one group batteries 41.

The cooler 232a cools a group of batteries 42. The cooler 232a does not cool the other group of batteries 41. One cooler 232a cools one cell battery 45 or one group batteries 42.

Third Embodiment

This embodiment is a modification based on the preceding embodiment. In the above embodiment, the oil-back control is provided during the operation of the refrigeration cycle 10. Alternatively, the oil-back control may be executed only when an execution condition are satisfied.

Figure 6:
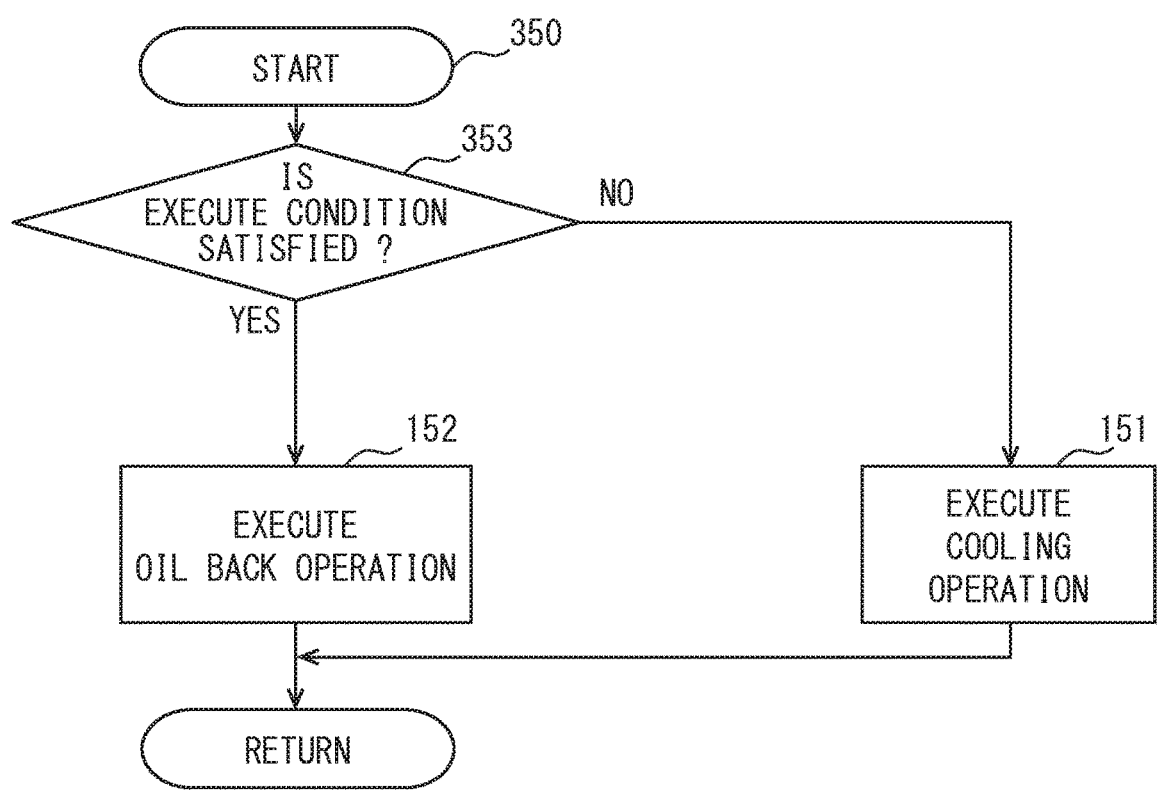
FIG. 6 is a flowchart showing control of a third embodiment.

In FIG. 6, a control process 350 for the controller 15 controlling the refrigeration cycle 10 is shown. The control process 350 is executed by the controller 15. The control process 350 has a step 353 of determining whether or not the execution condition is satisfied. The step 353 provides a determination unit that determines whether or not the execution condition is satisfied. The control device 15 branches to a step 152 when the execution condition is satisfied in the step 353. The control device 15 branches to a step 151 when the execution condition is not satisfied in the step 353.

Various conditions may be used as the execution condition. The execution condition may be set, for example, so that the oil-back operation is executed only in an operation state in which the retained oil is likely to be generated in the coolers 31a and 32a. The execution condition, for example, under a low thermal load with a low outside air temperature or a low battery load with a small amount of charge/discharge of the battery 40, the refrigerant flow rate is narrowed, so that the retained oil is likely to occur. Therefore, the oil-back operation may be executed under a low heat load and/or a low battery load.

The execution condition may be set, for example, to be satisfied when the refrigeration cycle 10 is continuously operated for a predetermined period or a predetermined time. The execution condition may be set, for example, to be satisfied when the continuous operation time of the refrigeration cycle 10 exceeds a predetermined threshold time. The execution condition may be set, for example, to be satisfied when a predetermined operating state of the refrigeration cycle 10 occurs.

Fourth Embodiment

This embodiment is a modification based on the preceding embodiment. In the above embodiment, one type of oil-back operation is provided. Alternatively, the battery cooling refrigeration cycle device may provide a first oil-back operation and a second oil-back operation. The first oil-back operation and the second oil-back operation are characterized by a difference in a scheduled oil-back amount. The first oil-back operation is milder than the second oil-back operation with respect to an effect of the oil back, for example. That is, the amount of oil backed by the second oil-back operation is smaller than the amount of oil backed by the first oil-back operation. Therefore, the first oil-back control is also called mild control. The second oil-back control is also called strong control. Each of the plurality of electric expansion valves may be controlled to have a different arbitrary opening. The difference between the first oil-back control and the second oil-back control is provided by forcibly controlling the openings of the plurality of electric expansion valves into different from each other, and into an opening different from the opening provided by the temperature feedback.

Figure 7:
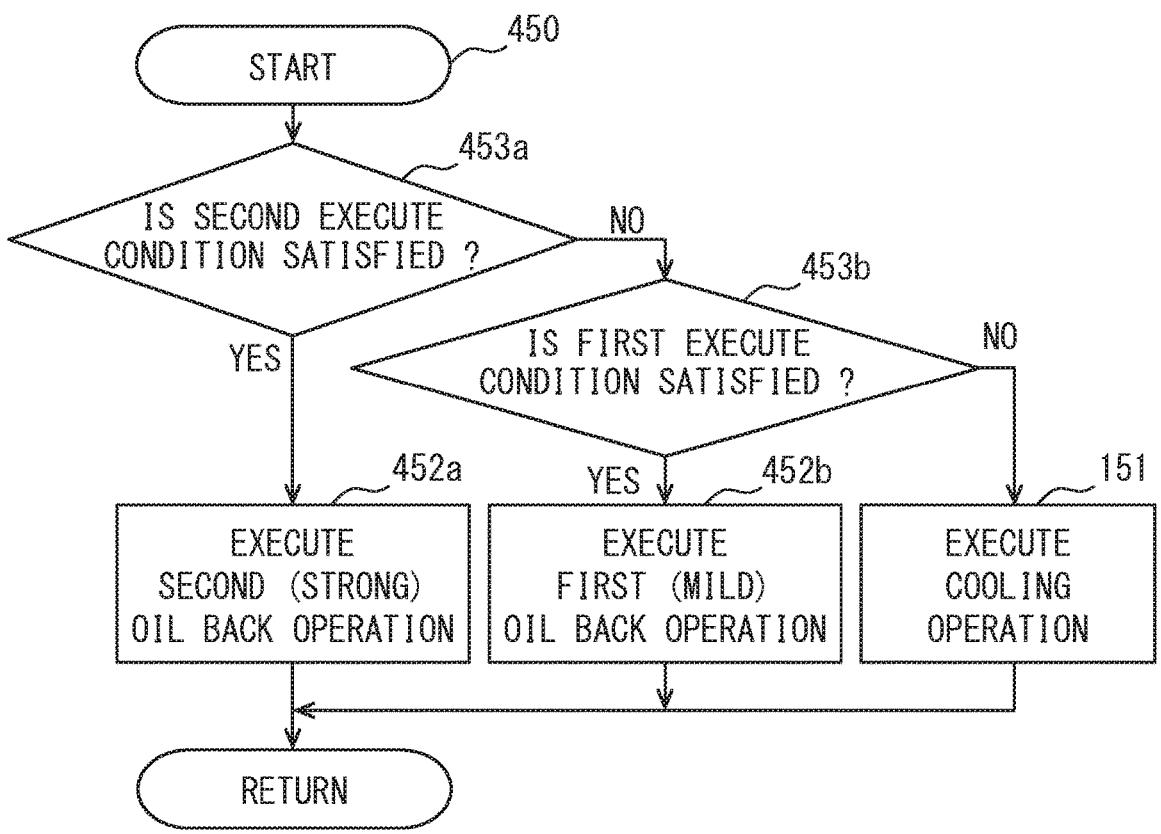
FIG. 7 is a flowchart showing control of a fourth embodiment.

In FIG. 7, a control process 450 is shown. In this process, the second oil-back operation is executed if the second execution condition for executing the strong oil-back control is satisfied. When the first execution condition for executing the mild oil-back control is satisfied, the second oil-back operation is executed.

In a step 453a, the control device 15 determines whether or not the second execution condition is satisfied. If the second execution condition is satisfied, the process proceeds to a step 452a. If the second execution condition is not satisfied, the process proceeds to a step 453b. In the step 453a, the control device 15 determines whether or not the first execution condition is satisfied. If the first execution condition is satisfied, the process proceeds to a step 452b. If the first execution condition is not satisfied, the process proceeds to 151. The step 453a and the step 453b provide determination units.

In the step 452a, the controller 15 executes a relatively strong oil-back operation by executing the second oil-back control. In the step 452b, the control device 15 executes a relatively mild oil-back operation by executing the first oil-back control. The steps 452a and the steps 452b provide oil-back units that execute oil-back control.

In the first oil-back control, the same oil-back control as in the above-described embodiment is executed. In the second oil-back control, an oil-back control is performed in which the retained oil is flushed away more strongly than the first oil-back control. In the second oil-back control, for example, the electric expansion valves 31a and 32a, which are the flow rate adjusting units, are controlled so that the refrigerant flows only in one parallel system.

According to this embodiment, the determining unit is provided by the step 453a and the step 453b. The determination unit determines whether only the first oil-back control can be executed, the second oil-back control that backs oil strongly than the first oil-back control can be executed, or both the first oil-back control and the second oil-back control cannot be executed. Further, the step 452a and the step 452b provide an oil-back control unit. The step 452b includes a first oil-back control unit that executes the first oil-back control when the determination unit determines that only the first oil-back control can be executed. Further, the step 452a includes a second oil-back control unit that executes the second oil-back control when the determination unit determines that the second oil-back control can be executed.

Figure 8:
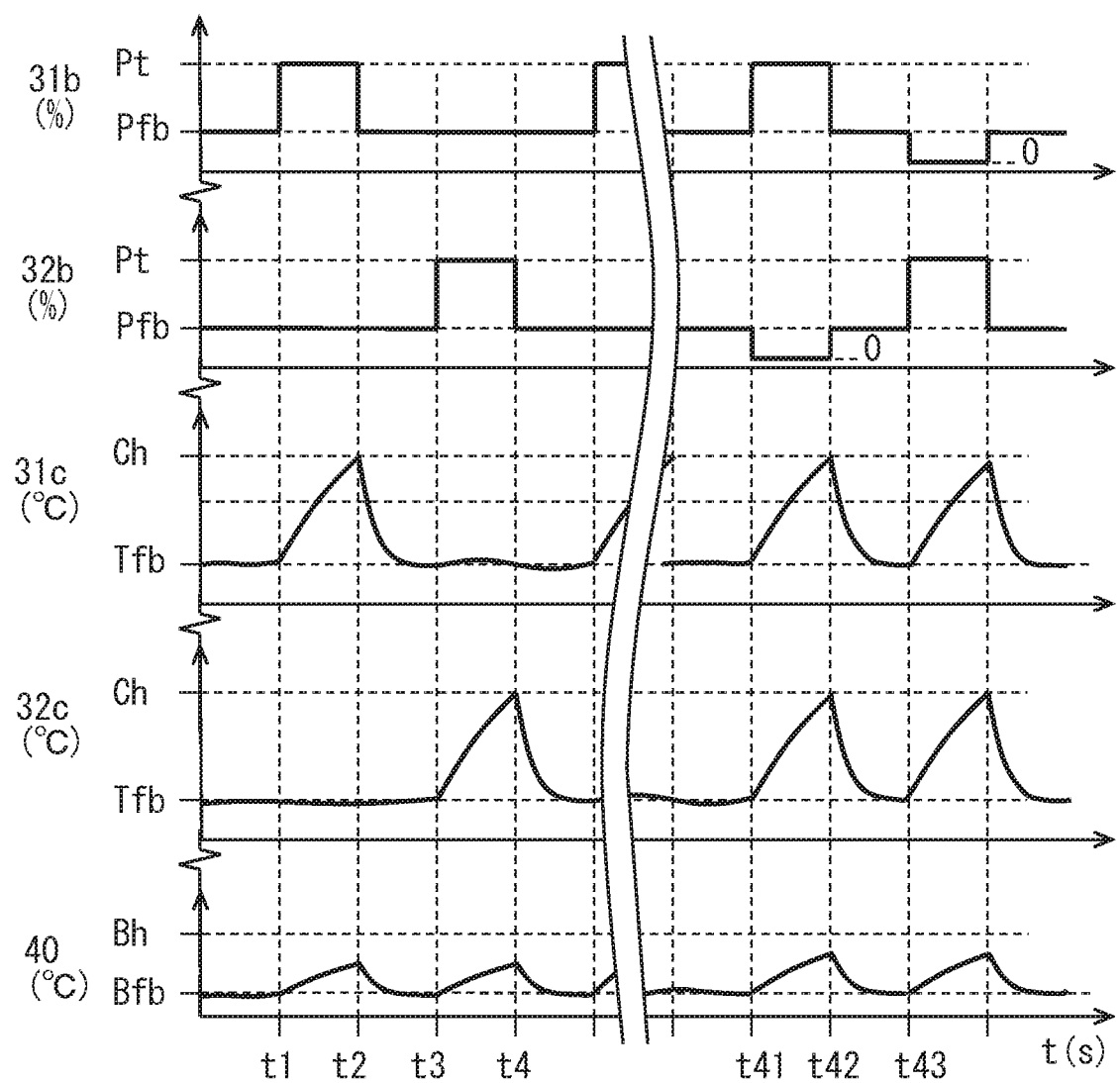
FIG. 8 is a waveform diagram showing an example of operation of the refrigeration cycle.

In FIG. 8, the first oil-back operation supplies a difference in refrigerant flow rate to the plurality of parallel systems 31 and 32, for example. The first oil-back operation is the same as the oil-back operation of the preceding embodiment. Therefore, when the first parallel system 31 is under normal temperature feedback control, the second parallel system 32 is forcibly controlled to increase the refrigerant flow rate. The temperature feedback control and the forced control are alternately executed.

The second oil-back operation supplies, for example, a difference in refrigerant flow rate larger than the difference in refrigerant flow rate in the first oil-back operation. This large difference is provided by controlling the opening degrees of the plurality of electric expansion valves to be different from each other. Alternatively, the second oil-back operation is executed for the entire battery cooling system 30, for example. Thereby, the retained oil is flushed away from the entire battery cooling system 30 toward the compressor. For example, in a merging portion of the plurality of parallel systems 31 and 32, the retained oil that has reversed in the first oil-back operation is also flushed away in the second oil-back operation.

Specifically, in the first oil-back operation, only one of the parallel systems 31 and 32 is controlled for oil back by stopping the temperature control. In the second oil-back operation, all the temperature controls of the plurality of parallel systems 31 and 32 are stopped, and the refrigerant is flowed to only one of the plurality of parallel systems 31 and 32 for backing the oil. One parallel system that is subject to the oil back is sequentially switched among a plurality of parallel systems.

In the second oil-back operation, for example, the electric expansion valve 31b is opened to the opening degree Pt so as to increase the refrigerant flow rate to the one parallel system 31, and the electric expansion valve 32b is closed to 0 (zero) to as to decrease or stop the refrigerant flow rate to the other parallel system 32. In this case, the refrigerant concentrates only on the one parallel system 31 that is subject to the oil-back. As a result, the refrigerant flow rate of the one parallel system 31 becomes larger than the refrigerant flow rate obtained by the first oil-back control. Therefore, the retained oil of the one parallel system 31 is strongly flushed away. Such a second oil-back operation causes a significant decrease in cooling capacity. However, the battery cooling refrigeration cycle can be used because the battery 40 has a large thermal capacity and demonstrates a relatively slow temperature change as compared with an air conditioning for air.

This second oil-back operation can suppress the retained oil in the battery cooling system 30 without requiring a large flow rate of the compressor 12. Further, the first and second oil-back controls are repeated with an intervening periods (t2-t3, t42-t43) in the temperature control. Therefore, a situation where the temperature of the battery 40 rises excessively is suppressed. The second oil-back operation may be provided as an oil-back operation in other embodiments.

Fifth Embodiment

This embodiment is a modification based on the preceding embodiment. In the above embodiment, the refrigeration cycle 10 provides the air conditioning system 20 and the battery cooling system 30. Alternatively, the refrigeration cycle 10 may provide only the battery cooling system 30. Additionally or alternatively, the number of parallel systems 31 and 32 may be n, which is 3 or more.

Figure 9:
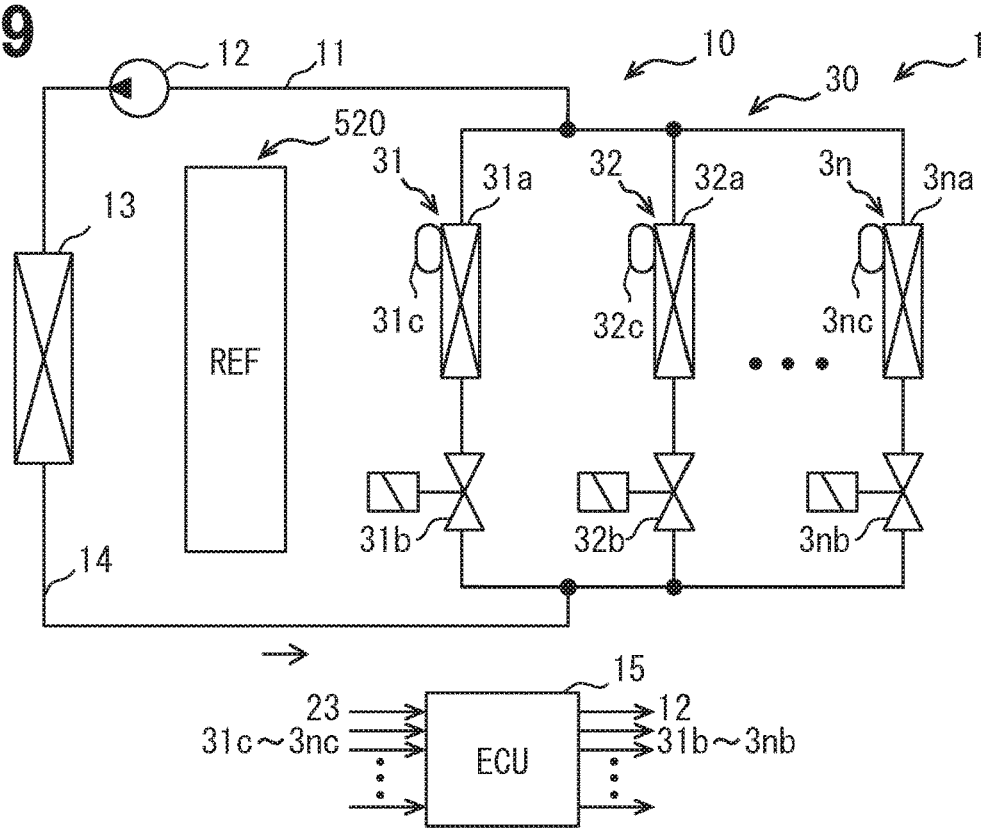
FIG. 9 is a block diagram showing a refrigeration cycle of a fifth embodiment.

In FIG. 9, the refrigeration cycle 10 provides only the battery cooling system 30. The dedicated refrigeration cycle 10 for the battery cooling system 30 contributes to increase the accuracy of battery temperature control.

The vehicle refrigeration cycle device 1 has an air conditioning refrigeration cycle 520 (REF). The air conditioning refrigeration cycle 520 is dedicated to providing an air conditioning system. Thereby, the battery cooling system 30 may adjust the temperature of the battery 40 by suppressing the mutual relation with the air conditioning. In particular, consideration of oil back in the air conditioning system can be suppressed. According to this embodiment, the oil-back operation for the plurality of parallel systems in the battery cooling system 30 can be executed. For example, the oil-back operation can be executed without affecting an air temperature control for the air conditioning.

The battery cooling system 30 has, in addition to the two parallel systems 31 and 32, at least one parallel system 3n. That is, the parallel system can include three or more parallel systems 31, 32, 3n.

Sixth Embodiment

This embodiment is a modification based on the preceding embodiment. In the above embodiment, only the plurality of electric expansion valves 31b and 32b provide the refrigerant flow rate for backing the oil. In addition to this, a bypass passage having on-off valves 631d and 632d may be provided in order to give a difference in the refrigerant flow rate to the plurality of parallel systems 31 and 32. The on-off valves 631d and 632d may be provided by electromagnetic valves.

Figure 10:
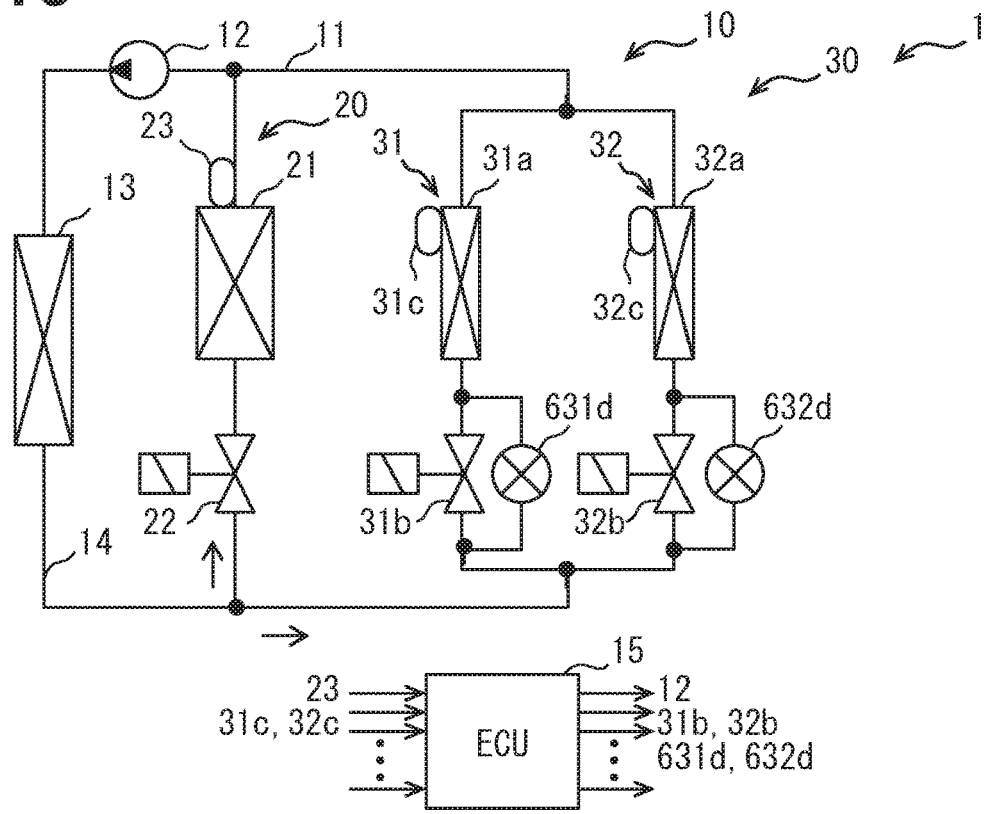
FIG. 10 is a block diagram showing a refrigeration cycle of a sixth embodiment.

In FIG. 10, the battery cooling system 30 has a plurality of parallel systems 31 and 32. The first parallel system 31 has an on-off valve 631d that bypasses the electric expansion valve 31b. The on-off valve 631d provides a bypass passage that bypasses the electric expansion valve 31b. The on-off valve 631d provides a full opening degree equal to or larger than the maximum opening degree of the electric expansion valve 31b. The on-off valve 631d provides a fully closed opening smaller than the minimum opening of the electric expansion valve 31b. Therefore, when the on-off valve 631d is fully closed, the electric expansion valve 31b is feedback-controlled. When the first parallel system 31 is operated to back the oil, the on-off valve 631d is fully opened regardless of the opening degree of the electric expansion valve 31b. Thereby, the refrigerant flows to flush away the retained oil.

The second parallel system 32 has an on-off valve 632d that bypasses the electric expansion valve 32b. The on-off valve 632d provides a bypass passage that bypasses the electric expansion valve 32b. The on-off valve 632d provides a full opening degree equal to or larger than the maximum opening degree of the electric expansion valve 32b. The on-off valve 632d provides a fully closed opening smaller than the minimum opening of the electric expansion valve 32b. Therefore, when the on-off valve 632d is fully closed, the electric expansion valve 32b is feedback-controlled. When the second parallel system 32 is operated to back the oil, the on-off valve 632d is fully opened regardless of the opening degree of the electric expansion valve 32b. Thereby, the refrigerant flows to flush away the retained oil.

The plurality of on-off valves 631d and 632d are controlled to open at least one passage of the plurality of parallel systems 31 and 32, and close or narrow at least one remaining passage. Therefore, the refrigerant flow rate in the former passage increases and the refrigerant flow rate in the latter passage decreases. The amount of refrigerant flowing in at least one of the plurality of parallel systems 31, 32 increases. Thereby, the retained oil is flushed away. The passages in which the refrigerant flow rate increases are replaced alternately or in order so as to suppress a deviation of the retained oil. Therefore, the flow rate adjusting valve includes the electric expansion valves 31b and 32b. Further, the flow rate adjusting valve may include on-off valves 631d and 632d.

Also in this embodiment, the retained oil in the battery cooling system 30 is suppressed. As a result, oil back in the compressor 12 is improved. Further, a deterioration in performance of the coolers 31a and 32a due to the retained oil is suppressed. Further, the oil-back operation may be provided by the additional on-off valves 631d and 632d without changing the control of the electric expansion valves 31b and 32b in the plurality of parallel systems 31 and 32.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiment, the plurality of coolers 31a, 32a, and 3na in the battery cooling system 30 directly cool the battery 40. Alternatively, a secondary thermal transfer system may be interposed between the plurality of coolers 31a, 32a, 3na and the battery 40. The secondary thermal transfer system is provided by, for example, a secondary medium such as water, antifreeze, oil, and the like, and a circulation system that circulates the secondary medium. Further, the circulation system has a heat exchanger that heat-exchanges the coolers 31a, 32a, 3na and the secondary medium, and a heat exchanger that heat-exchanges the battery and the secondary medium. Even when such a secondary thermal transfer system is provided, the retained oil can be suppressed without excessively increasing power consumption in the compressor 12.

What is claimed is:
1. A refrigeration cycle device for cooling a battery, the device comprising:
   a refrigeration cycle including a plurality of parallel systems for cooling the battery; and a controller configured to perform:

a temperature control which controls a flow rate of a refrigerant flowing through the plurality of parallel systems so as to adjust a temperature of the battery;

an oil-back control which flushes away an oil retained in a part among the plurality of parallel systems by increasing a refrigerant flow rate flowing in the part among the plurality of parallel systems more than the refrigerant flow rate flowed by the temperature control, and at the same time, maintaining or decreasing a refrigerant flow rate flowing through a remaining part among the plurality of parallel systems; and a determination control which determines whether only a first oil-back control can be executed, a second oil-back control that backs oil strongly than the first oil-back control can be executed, or both the first oil-back control and the second oil-back control cannot be executed, wherein the oil-back control includes:

the first oil-back control which executes the first oil-back control when the determination control determines that only the first oil-back control can be executed; and the second oil-back control which executes the second oil-back control when the determination control determines that the second oil-back control can be executed.

2. The refrigeration cycle device for cooling a battery claimed in claim 1, wherein the oil-back control sequentially changes the part of the parallel systems among the plurality of parallel systems.

3. The refrigeration cycle device for cooling a battery claimed in claim 1, wherein the plurality of parallel systems includes two parallel systems, and wherein the oil-back control sequentially changes the part of the parallel systems among the plurality of parallel systems.

4. The refrigeration cycle device for cooling a battery claimed in claim 1, wherein each of the plurality of parallel systems includes a cooler and a flow rate adjusting valve that controls a flow rate of the refrigerant in the cooler.

5. The refrigeration cycle device for cooling a battery claimed in claim 4, wherein the plurality of coolers belonging to the plurality of parallel systems cool a cell battery.

6. The refrigeration cycle device for cooling a battery claimed in claim 4, wherein the temperature control controls an opening of the flow rate adjusting valve to a first opening degree, and wherein the oil-back control controls the opening of the flow rate adjusting valve to a second opening degree larger than the first opening degree.

7. The refrigeration cycle device for cooling a battery claimed in claim 4, wherein the flow rate adjusting valve includes an electric expansion valve.

8. The refrigeration cycle device for cooling a battery claimed in claim 4, wherein the flow rate adjusting valve includes an on-off valve.

9. The refrigeration cycle device for cooling a battery claimed in claim 1, wherein a control by the oil-back control is intermittent.

* * * * *